(12) United States Patent
Nachman

(10) Patent No.: US 8,150,840 B2
(45) Date of Patent: Apr. 3, 2012

(54) DYNAMIC RSS SERVICES

(75) Inventor: George Nachman, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 68 days.

(21) Appl. No.: 11/407,487

(22) Filed: Apr. 19, 2006

(65) Prior Publication Data

US 2007/0250510 A1    Oct. 25, 2007

(51) Int. Cl.
*G06F 17/00* (2006.01)
*G06F 15/16* (2006.01)

(52) U.S. Cl. ......... 707/722; 707/758; 709/219; 715/205

(58) Field of Classification Search ................... 707/781, 707/782, 971–974, 722, 758; 709/217, 219; 715/205
See application file for complete search history.

(56) References Cited

U.S. PATENT DOCUMENTS

| | | | | |
|---|---|---|---|---|
| 5,918,239 | A * | 6/1999 | Allen et al. ................... | 715/210 |
| 5,978,817 | A * | 11/1999 | Giannandrea et al. ........ | 715/207 |
| 6,134,584 | A * | 10/2000 | Chang et al. .................. | 709/219 |
| 7,065,704 | B1 * | 6/2006 | Xu ................................. | 715/205 |
| 7,127,493 | B1 * | 10/2006 | Gautier ......................... | 709/217 |
| 2001/0056460 | A1 * | 12/2001 | Sahota et al. ................. | 709/201 |
| 2002/0143817 | A1 * | 10/2002 | Dutta et al. ................... | 707/513 |
| 2004/0034626 | A1 * | 2/2004 | Fillingham et al. .............. | 707/3 |
| 2004/0073867 | A1 * | 4/2004 | Kausik et al. ................. | 715/500 |
| 2005/0289468 | A1 * | 12/2005 | Kahn et al. .................... | 715/738 |
| 2006/0217126 | A1 * | 9/2006 | Sohm et al. ................... | 455/454 |
| 2006/0230021 | A1 * | 10/2006 | Diab et al. ........................ | 707/3 |
| 2006/0259585 | A1 * | 11/2006 | Keohane et al. .............. | 709/219 |
| 2007/0225047 | A1 * | 9/2007 | Bakos ............................ | 455/566 |

OTHER PUBLICATIONS

Sean, "Microsoft RSS Blog: Windows RSS Publisher's guide, Part 1: Feed Auto-discovery", Aug. 3, 2005, Microsoft RSS Blog, 5 pages.*
Paul Boutin, "How to Speed-Read the Net", Mar. 4, 2004, Slate Magazine, 5 pages.*
Sandi Hardmeier, "RSS: An Information Revolution", Nov. 10, 2005, Microsoft, 8 pages.*
Buyukkokten et al. "Power Browser: Efficient Web Browsing for PDAs", 2000, Proceedings of the ACM Conference on Computers and Human Interaction 2000, 8 Pages.*
"Spyglass Prism" 1997. Spyglass Inc. 10 pages.*
"AvantGo for RSS," Nov. 10, 2003, iAnywhere Solutions, Inc., 2 pages, [online] Retrieved from the Internet<URL:http://my.avantgo.com/rss/>.
Blekas, A. et al., "Use of RSS Feeds for Content Adaptation in Mobile Web Browsing," W4A at WWW2006, ACM, May 23-26, 2006, 7 pages, [online] Retrieved from the Internet<URL:http://www.w4a.info/2006/prog/11-blekas.pdf>.

(Continued)

*Primary Examiner* — John R. Cottingham
*Assistant Examiner* — James E Richardson

(57) ABSTRACT

An Internet browser application is arranged to automatically display an RSS feed. When a web page is requested, if the Internet browser is selected to be in an RSS feed mode, the Internet browser detects for an RSS feed for the requested web page. If the RSS feed is detected, the RSS feed is loaded in parallel with loading the requested web page. Thereafter, the loaded RSS feed is displayed. A user may switch from the RSS feed mode to a normal mode for displaying the already loaded requested web page.

9 Claims, 7 Drawing Sheets

OTHER PUBLICATIONS

Bradbury, N., "Nick Bradbury: Dynamic RSS Feeds and Bandwidth Consumption," 3 pages, [online] Retrieved from the Internet<URL:http://nick.typepad.com/blog/2004/09/rss_bandwidth_c.html>.

Papa, J., "Data Points: RSS Feeds on Smartphone," MSDN Magazine, Dec. 2006, 7 pages, [online] Retrieved from the Internet<URL:http://msdn.microsoft.com/msdnmag/issues/06/12/datapoints/>.

"Top 10 Pocket PC RSS Readers," About: Palmtops / PDAs, 2 pages, [online] Retrieved from the InternetL<URL:http://palmtops.about.com/cs/productreviews/tp/Pocket_RSS.htm>.

* cited by examiner

DYNAMIC RSS SERVICES

BACKGROUND

As well known, the Internet is an expansive source of information. Internet users seeking information generally access the Internet via computer applications known in the art as "Internet browsers." Various different Internet browsers are available (e.g., Internet Explorer® by Microsoft Corporation, Safari™ by Apple Computer, Inc., Blazer™ by Palm, Inc., Firefox® by Mozilla Corporation, Opera™ by Opera Software ASA).

Referring to FIG. 1, in a typical networked computing environment 10, client computer systems 12, 14, 16, 18 access information by downloading (or simply "loading") "web pages" (or "webpages") from the Internet 20, where one or more of such web pages are maintained (or stored) on a server computer system 22. More particularly, the client computer systems 12, 14, 16, 18 use resident Internet browsers to load and display web pages from the Internet 20.

Those skilled in the art will recognize that not all of the information contained in a web page may be displayed through the Internet browser at one time. Instead, a user may have to navigate through (e.g., "scroll" up and down and/or left and right) a web page to find particular information. The amount of navigation needed to locate particular information on a web page increases as (i) the display size of the Internet browser decreases due to, for example, smaller computer screen sizes, and/or (ii) the amount of information contained in the web page increases. In some cases, having to navigate too much for a web page can impair the user's ability to effectively use that web page. For example, referring to FIG. 2, which shows a screenshot 30 using a typical Internet browser, the user sees little substantive content at any one time and may have to scroll down considerably to find particular information on the web page.

In regard to display sizes, when using a smaller display size, the amount of web page information that can be displayed at one time decreases. By decreasing the amount of web page information that can be displayed at one time, a user on average will have to navigate more to locate particular information on the web page relative to a case where a larger display can be used to display the web page information.

In regard to the amount of information contained in a web page, when more information is contained in the web page, a lesser percentage of the total web page information can be displayed at one time. Thus, a user on average will have to navigate more to locate particular information on the web page relative to a case where the web page contains a lesser amount of information.

In an effort to streamline web page loading and displaying, various web page hosts make available what are generally known in the art as "RSS" (RSS has been used to refer to, for example, "Really Simple Syndication", "Rich Site Summary", "Resource Description Framework [RDF] Site Summary", and "Real-time Simple Syndication"). RSS is a format that relies on extensible markup language (XML) code that constantly scans the content of a web page for updates and broadcasts the updates to subscribing users through an RSS "feed." The updates are usually presented as one line links and/or short summaries, without images, advertisements, and other extraneous information.

RSS feeds are typically used with news web pages and personal web page logs (also referred to in the art as "blogs"), although any web page can use an RSS feed to disseminate information. A user can typically freely subscribe to receive one or more RSS feeds through use of an RSS feed reader (also referred to in the art as "aggregator" or "news aggregator"). The user can add an RSS feed of a web page to his/her RSS feed reader by either (i) selecting an RSS button on the web page or (ii) entering a web address of the RSS feed. Further, those skilled in the art will note that in addition to being available on traditional computer systems (e.g., personal computers (PCs), laptops (or "notebooks")), RSS feeds can also be read on handheld computing devices (e.g. personal digital assistants (PDAs)), cellular phones, and portable e-mail devices.

SUMMARY

According to at least one aspect of one or more embodiments of the present invention, a method of displaying information with an Internet browser application includes accessing the Internet for a requested web page and initializing loading of the requested web page. During the initializing, the method detects for a presence of an RSS feed. In response to detecting the RSS feed, the method loads (which may include a push (e.g., from a server) or a retrieve (e.g., a pull from a device)) the RSS feed and displaying the RSS feed or the requested web page.

According to at least one other aspect of one or more embodiments of the present invention, a computer system includes a first module arranged to initialize loading of a requested web page. During the initializing, a second module is arranged to detect presence of an RSS feed. The system also includes a third module that is arranged to load the RSS feed in response to detecting the RSS feed. A fourth module is arranged to display the RSS feed or the requested web page.

According to at least one other aspect of one or more embodiments of the present invention, a system includes a client computer and a server computer. The client computer has an Internet browser application installed thereon. The Internet browser application arranged to request loading a web page from the Internet. During the loading, the browser detects an availability of an RSS feed for the requested web page if a first mode for displaying the RSS feed is selected. The browser loads the RSS feed dependent on the detecting and displays the loaded RSS feed if the first mode is selected or displays the loaded requested web page if a second mode for displaying the requested web page is selected. The server computer is operatively connected to the Internet and arranged to store at least one of the requested web page and the RSS feed.

According to at least one other aspect of one or more embodiments of the present invention, a computer-readable medium has instructions stored therein. The instructions are configured so that when executed by a processor, it causes the processor to access the Internet for a requested web page. The processor loads of the requested web page, and during the loading, detects presence of an RSS feed during the initializing. In response to detecting the RSS feed, the processor loads the RSS feed and displays the RSS feed or the requested web page.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

As used herein, a "main" web page is one that is ordinarily searched for when desiring access to the complete web page (e.g., "www.cnn.com" is a main web page). Further, an RSS feed "for the" main web page refers to an RSS feed corresponding to and/or specified by the main web page. Further still, a "normal mode" refers to a mode in which a main web page is displayed. In addition, an "RSS feed mode" refers to a mode in which an RSS feed is displayed.

In general, embodiments of the present invention relate to a technique for automatically presenting a web page using an RSS feed. Further, in one or more embodiments, a user may have concurrent local access to both a main web page and any available RSS feed for the main web page. Further still, in one or more embodiments, an Internet browser application may allow a user to select/toggle between a normal mode and an RSS feed mode.

Figure 3:
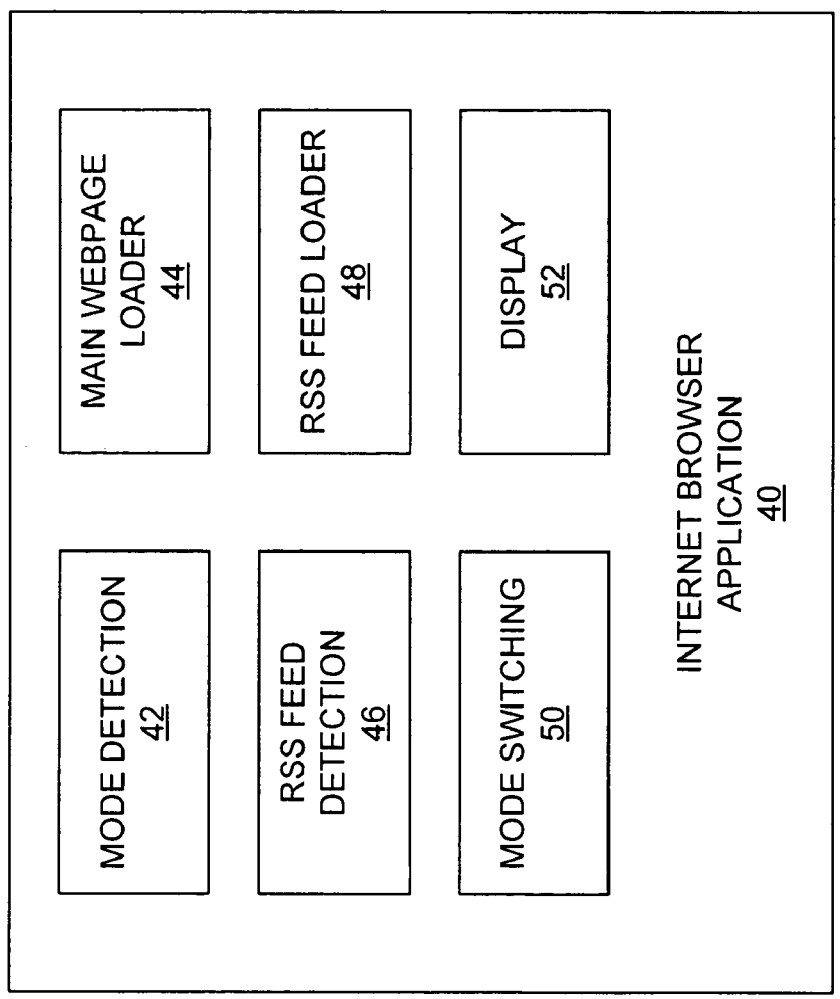
FIG. 3 shows a component diagram of an Internet browser application in accordance with an embodiment of the present invention.

FIG. 3 shows a component diagram of an Internet browser 40 in accordance with an embodiment of the present invention. Particularly, the Internet browser 40 is formed of a plurality of modules 42, 44, 46, 48, 50, 52, where a "module" refers to any program logic or functionality implemented in hardware and/or software.

In one or more embodiments, a mode detection module 42 may be arranged to detect a mode selected for the Internet browser 40. The selected mode may either be a normal mode or an RSS feed mode. Moreover, the mode may be selected directly by a user via one or more of various different types of graphical user interfaces (GUIs) (e.g., pull-down menus, checkboxes, textboxes) and/or input means (e.g., a particular combination of keyboard key presses).

Further, in one or more embodiments, the Internet browser 40 may include a main web page loader module 44. The main web page loader module 44 may be arranged to load a main web page from the Internet. Accordingly, the main web page loader module 44 may specify and/or support protocols (e.g., hypertext transport protocol (HTTP)) for connecting to and communicating over the Internet.

Additionally, in one or more embodiments, the Internet browser 40 may include an RSS feed detection module 46. The RSS feed detection module 46 may only be enabled when the mode detection module 42 indicates that an RSS feed mode is selected. In such a case, as the main web page loader module 44 loads a main web page, the RSS feed detection module 46 is arranged to detect the presence of an RSS feed for the main web page. The RSS feed may be detected in response to the main web page loader module 44 loading data in the main web page that specifies the existence and location of an RSS feed for the main web page. For example, in a hypertext markup language (HTML) code for a main web page, an RSS "tag" including a web address (i.e., a uniform resource locator (URL)) may indicate the presence and location of an RSS feed for the main web page (e.g., <link rel="alternate" type="application/rss+xml" title="RSS" href="http://www.example.org/rss.xml"/>).

Further, in one or more embodiments, the Internet browser 40 may include an RSS feed loader module 48. The RSS feed loader module 48 may be arranged to load an RSS feed for a main web page. Thus, for example, in response to detection of an RSS feed by the RSS feed detection module 46, the RSS feed loader module 48 loads the RSS feed. Further, the RSS feed loader module 48 may specify and/or support protocols (e.g., hypertext transport protocol (HTTP)) for connecting to and communicating over the Internet.

In one or more embodiments, the Internet browser 40 may also include a mode switching module 50. The mode switching module 50 is arranged to allow a user to switch between a normal mode and an RSS feed mode. Moreover, in one or more embodiments, system-level operations may access the mode switching module 50 to toggle between the normal mode and the RSS feed mode.

Further, in one or more embodiments, the Internet browser 40 may include a display module 52. The display module 52 may be arranged to display the main web page loaded by the main web page loader module 44 if the mode detection module 42 indicates that a normal mode is selected. Alternatively, the display module 52 displays an available RSS feed loaded by the RSS feed loader module 48 if the mode detection module 42 indicates than an RSS feed mode is selected.

As described above with reference to FIG. 3, the Internet browser 40 includes a plurality of modules 42, 44, 46, 48, 50, 52, each having particular functionality. However, in one or more other embodiments, a number of modules different than that shown in FIG. 4 may be used. Further, in one or more embodiments, the functionality of a particular module of the Internet browser 40 may be combined with that of another. Further still, in one or more embodiments, the functionality of a particular module of the Internet browser 40 may be divided to form two or more modules. Further still, in one or more embodiments, modules of the Internet browser 40 may function in any combination of data connectivity among the modules. Further still, in one or more embodiments, the Internet browser 40 may support a "plug-in" architecture, where one or more modules may be available as plug-ins for the Internet browser 40.

Figure 4:
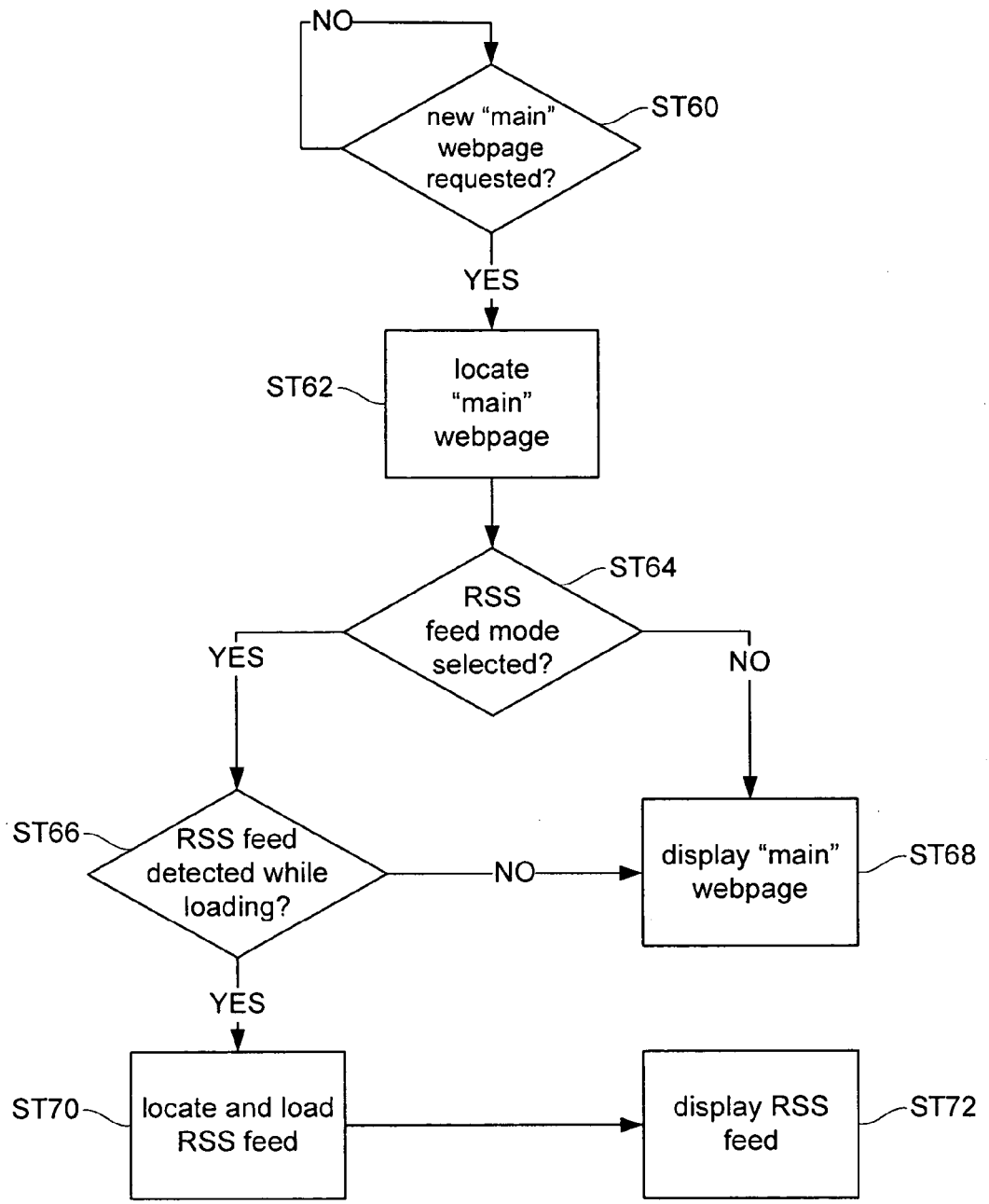
FIG. 4 shows a flow process in accordance with an embodiment of the present invention.

FIG. 4 shows a flow process in accordance with an embodiment of the present invention. Particularly, FIG. 4 shows an operation of the Internet browser 40, the structure of which was described above with reference to FIG. 3.

When a new main web page is requested by a user in ST60, the main web page loader module 44, in ST62, attempts to locate the main web page. Such locating generally involves searching the Internet for the web address specified in the main web page request. Once this main web page is located, if an RSS feed mode is not selected as determined by the mode detection module 42 in ST64, the main web page loader module 44 continues to load and subsequently display the main web page ST68.

However, if an RSS feed mode is selected as determined by the mode detection module 42 in ST64, the RSS feed detection module 46, in ST66, detects for an RSS feed while the main web page loader module 44 loads the main web page. If the RSS feed detection module 46 detects the RSS feed while the main web page is loading, the RSS feed loader module 48, in ST70, locates and loads the RSS feed. Once the RSS feed has been loaded, the RSS feed is displayed ST72. Those skilled in the art will note that although the RSS feed is displayed, the main web page has also been loaded by the main web page loader module 44. Accordingly, the main web page and the RSS feed are concurrently local to the Internet browser 40.

Still referring to FIG. 4, if the RSS detection module 46, in ST66, does not detect an RSS feed while the main web page loader module 44 loads the main web page, this indicates there is no RSS feed for the main web page. In this case, the main web page is displayed ST68 (even though the RSS feed mode is selected).

In general, as described above with reference to FIG. 4, when an RSS feed mode is selected and an RSS feed for a requested main web page has been located, the RSS feed and the main web page are at least some point loaded in parallel by an Internet browser. In this case, the RSS feed is automatically displayed. However, at any time, a user may switch from the RSS feed mode to a normal mode, thereby causing the Internet browser to display the main web page. Those skilled in the art will note that because the main web page has already been loaded at the time the user switches from the RSS feed mode to the normal mode, the Internet browser may immediately, or substantially immediately, display the main web page in response to the mode being toggled.

As described above, in one or more embodiments, a main web page and an available RSS feed may be accessible to a user via selection of a particular mode. Loading the main web page and the RSS feed may occur in a variety of different ways. In one or more embodiments, when reading HTML code for a main web page, upon detection of an RSS feed, the RSS feed may be loaded and displayed while the main web page is loaded in the background. In one or more other embodiments, when reading HTML code for a main web page, upon detection of an RSS feed, the main web page may be loaded preferentially ahead of or "in front of" loading the RSS feed. Further still, in one or more embodiments, loading an entire main web page may be optional when an RSS feed for the main web page is detected and loaded. Moreover, in one or more embodiments, loading of a main web page and an RSS feed for the main web page may occur serially. For example, when an RSS feed for a main web page is detected, the main web page may load after the RSS feed has been completely loaded (and likely displayed).

Figure 2:
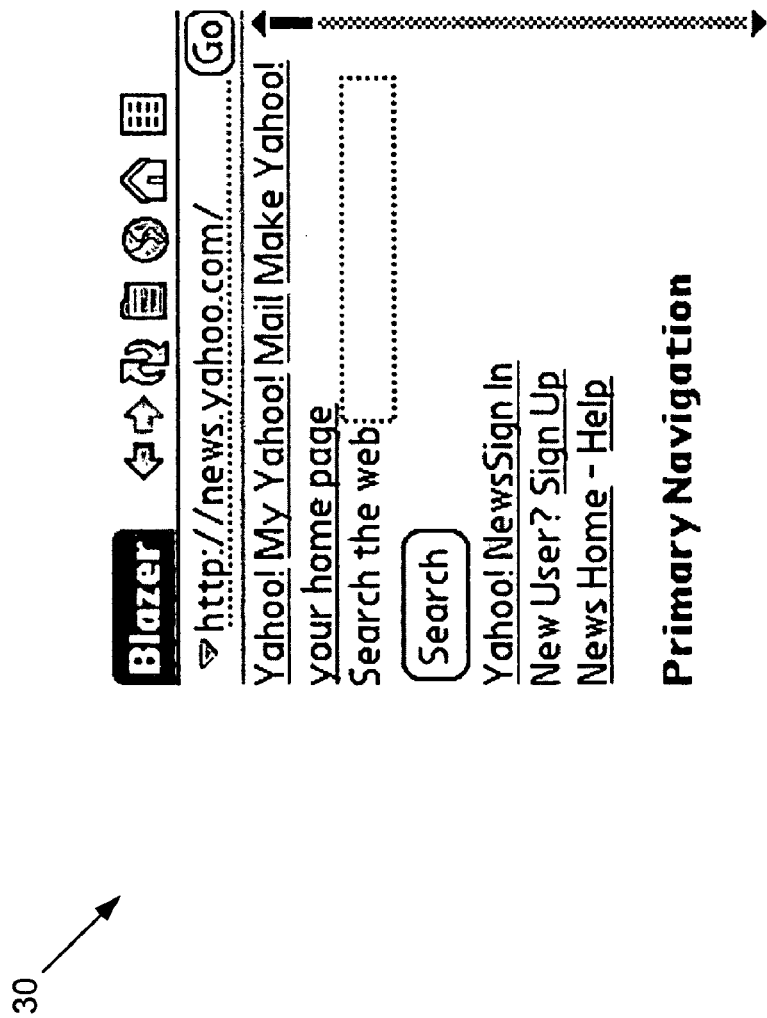
FIG. 2 shows a screenshot using a typical Internet browser application.
Figure 5:
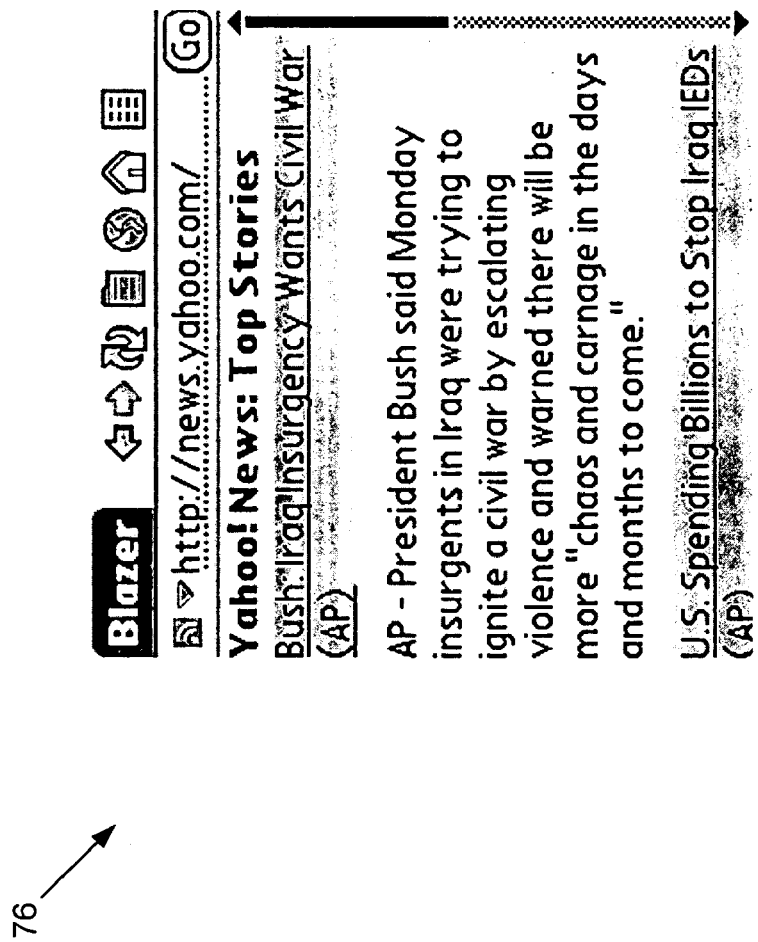
FIG. 5 shows a screenshot using an Internet browser application in accordance with an embodiment of the present invention.

Further, those skilled in the art will note that automatically displaying an available RSS feed when in an RSS feed mode provides for improved web page navigability and use due to at least the nature of RSS feeds described above. For example, FIG. 5 shows a screenshot 70 using the Internet browser 40 in accordance with an embodiment of the present invention. As discernible in FIG. 5, there is an increased amount of substantive content and less scrolling need relative to the content and scrolling need discernible in FIG. 2 described above. Further, in one or more embodiments, a visual indication may be provided via the Internet browser 40 to indicate that the currently displayed web page is an RSS feed.

Figure 1:
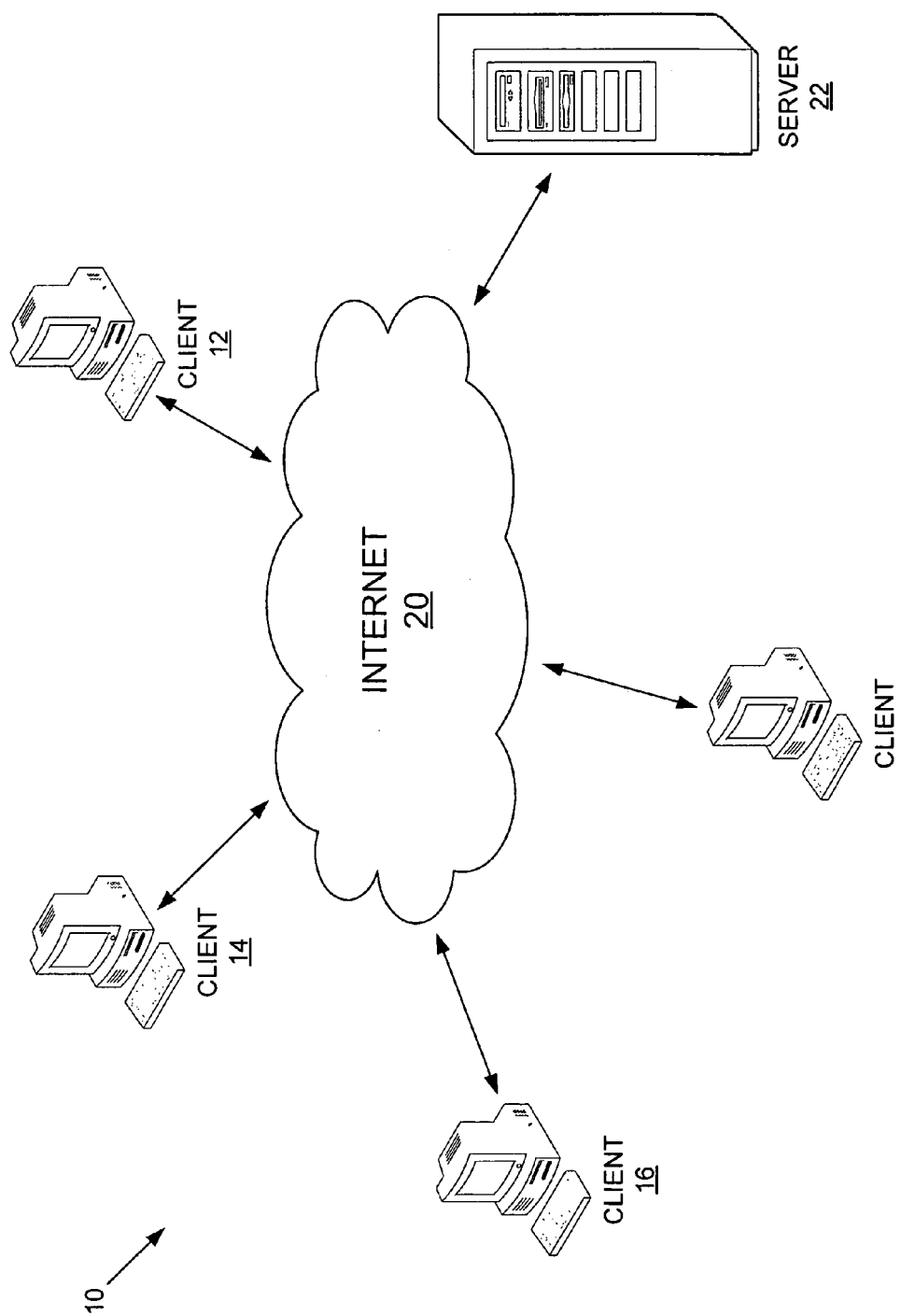
FIG. 1 shows a typical computing environment.

As described above with reference to FIGS. 3-5, the Internet browser 40 in one or more embodiments is installed on a client computer system (e.g., 12, 14, 16, 18 in FIG. 1). Further, a server computer system (e.g., 22 in FIG. 1) may be used to facilitate one or more embodiments of the present invention.

Figure 6:
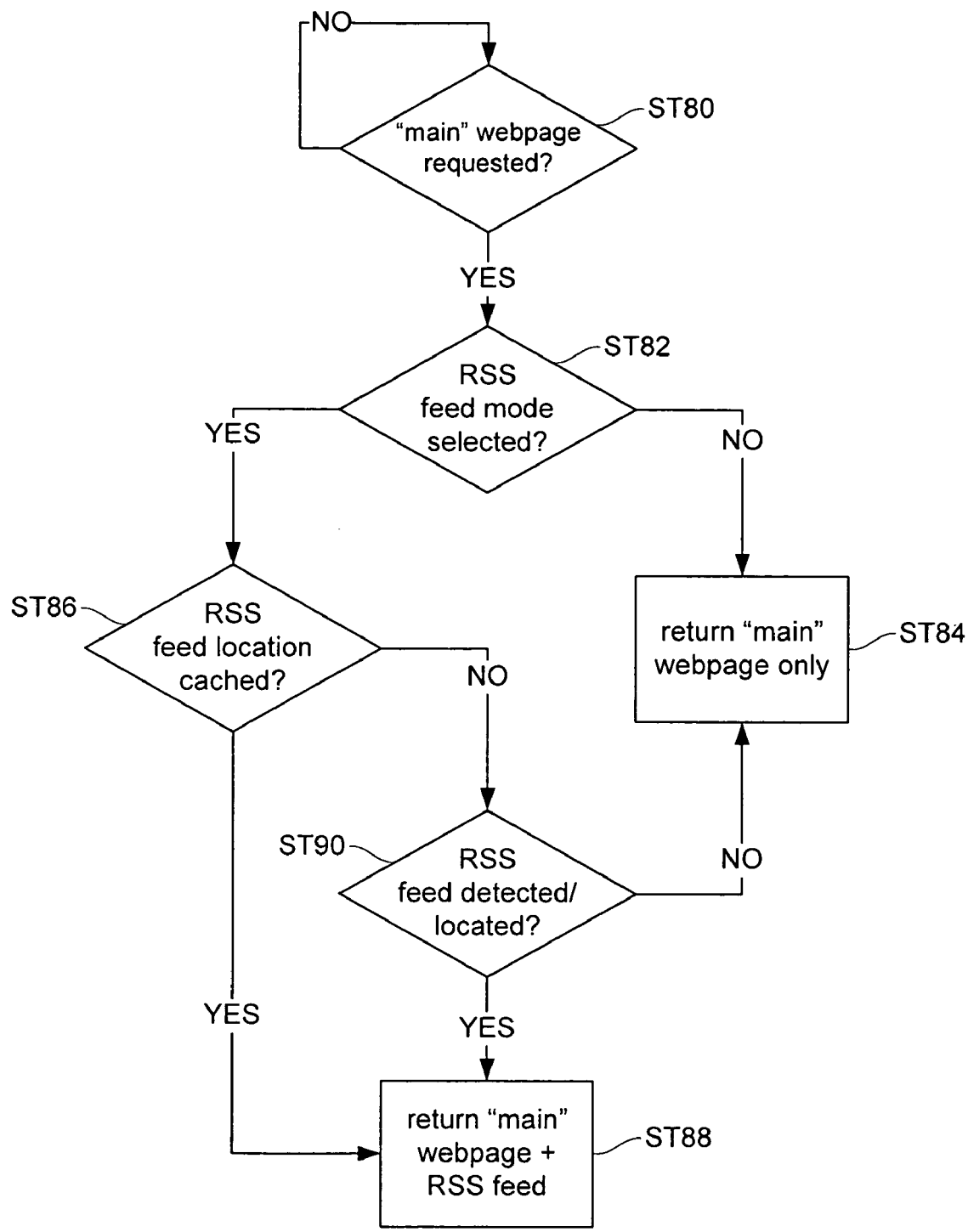
FIG. 6 shows a flow process in accordance with an embodiment of the present invention.

FIG. 6 shows a flow process in accordance with an embodiment of the present invention. Particularly, FIG. 6 shows an operation of a server computer system. When, in ST80, the server receives a main web page request from a client computer system, the server then detects whether the requesting client is in an RSS feed mode ST82. Such detection may depend on information contained in an HTTP packet sent from the client to the server. Further, in one or more other embodiments, the server may "know," for example, that a particular requesting client is always in an RSS feed mode based on an address of the requesting client.

If an RSS feed mode is not selected by the client as determined by the server in ST82, the server returns the main web page to the client ST84. However, if an RSS feed mode is selected by the client as determined by the server in ST82, the server searches a cache memory for a location of an RSS feed for the requested main web page ST86. If the RSS feed for the main web page is cached as determined by the server in ST86, the server returns the main web page and the RSS feed from the location specified by the cache memory ST88.

If the RSS feed for the main web page is not cached as determined by the server in ST86, an RSS feed for the main web page is attempted to be detected/located (by either the server or the client) ST90. Then, if the RSS feed for the main web page is detected/located in ST90, the server returns the main web page and the located RSS feed to the client ST88. Otherwise, if the RSS feed for the main web page is not detected/located in ST90, the server returns only the main web page to the client ST84.

Further, one or more embodiments described above may be associated with virtually any type of computer system, including multiprocessor and multithreaded uniprocessor systems, regardless of the operating system platform being used. Further, the computer system associated with one or more embodiments may be a handheld computing device, a cellular phone, or a mobile e-mail device. For example, it is noted that in one or more embodiments, the computer system may have a form factor of a handheld computing device (e.g., a Palm® TREO™, Blackberry™ by Research in Motion (RIM), Nokia® E61). Such handheld computing devices typically have small screens relative to personal computer and notebook monitors.

Figure 7:
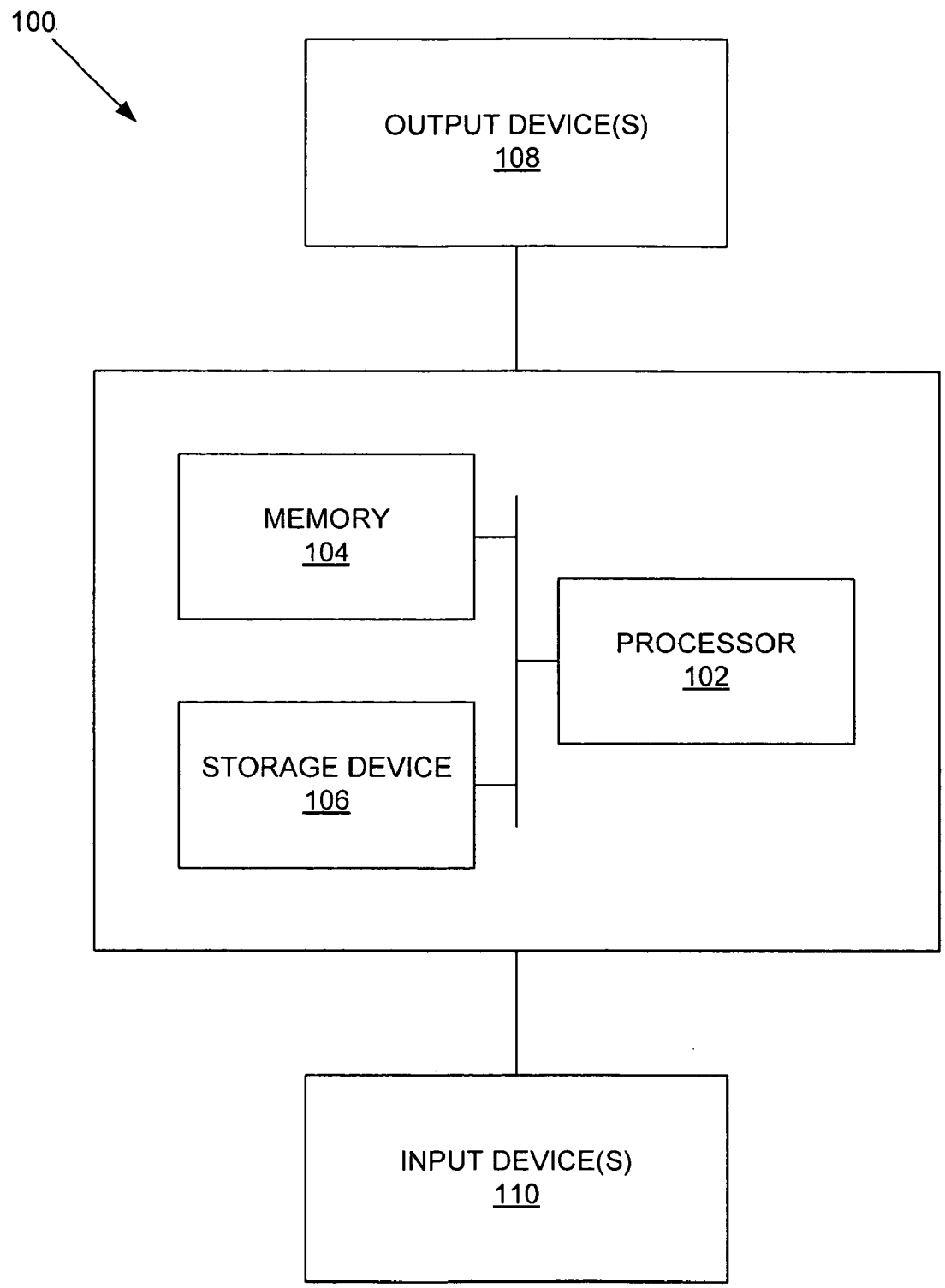
FIG. 7 shows a computer system in accordance with an embodiment of the present invention.

As shown in FIG. 7, a computer system 100 according to one or more embodiments includes at least one processor (e.g., a general-purpose processor, a field-programmable gate array (FPGA), an application-specific integrated circuit (ASIC), a graphics processor) 102, associated memory (e.g., random-access memory (RAM)) 104, at least one storage device (e.g., a hard disk drive, a memory card) 106, and numerous other elements (not shown) and functionalities typical of modern computer systems. Further, software instructions executable by the processor 102 to perform one or more embodiments of the present invention may be stored on a computer-readable medium such as the memory 104, the storage device 106, a compact disc (CD), a digital video disc (DVD), a universal serial bus (USB) drive, a "floppy" disk, a magnetic tape, or any other computer-readable storage device.

The computer system 100 may also include input devices (e.g., a keyboard, a touchpad, a stylus-sensitive screen, a pointer device) 108 and output devices (e.g., a liquid crystal display (LCD)) 110. Those skilled in the art will appreciate that the input and output devices may be of various forms not particularly described herein, but otherwise known to those skilled in the art. Further, the computer system 100 may be connected to a local area network (LAN) or a wide area network (WAN) via a wireless network interface connection (e.g., an 802.11-based wireless adapter, a cellular communication protocol, a wireless WAN card) (not shown).

Advantages of the present invention may include one or more of the following. In one or more embodiments, an Internet browser may be used to display a web page using an RSS feed.

Further, in one or more embodiments, an Internet browser may concurrently load a main web page and an RSS feed for the main web page so as to, for example, allow a user to be able to switch between a normal mode and an RSS mode.

Further, in one or more embodiments, an Internet browser may be used to automatically display an RSS feed when a user requests a main web page. Such a feature may be achieved by selecting an RSS feed mode that effectively causes the Internet browser to display an RSS feed when available.

Further, in one or more embodiments, an Internet browser that displays an RSS feed may not be a standalone RSS feed reader. Instead, the Internet browser may have integrated features for enabling the display of either a main web page or an RSS feed for the main web page at any given time (assuming the RSS feed for the main web page is available).

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth above to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description have been presented above in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Some embodiments may have been described above using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise above, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used above, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A method of displaying information with a browser application executed on a mobile computing device communicating over a wireless network, comprising:
    accessing a network for a requested web page via a wireless network interface connection;
    transmitting, via the network, selection of a first mode or a second mode to a server computer caching the requested web page from another computer;
    in response to receiving selection of the first mode:
        detecting presence of a feed corresponding to the requested web page from the server computer;
        in response to detecting the feed, automatically terminating loading of the requested web page and initializing loading of the feed by the browser application program without a user input;
        receiving the feed corresponding to the requested web page from the server computer; and
        in response to receiving the feed, displaying the feed;
    in response to receiving selection of the second mode:
        receiving the requested web page without the feed corresponding to the requested web page from the server computer; and
        in response to receiving the requested web page, displaying the requested web page;
    wherein transmitting the selection of the first mode or the second mode comprises transmitting information about the selection of the first mode or the second mode in a hypertext transfer protocol (HTTP) packet.

2. The method of claim 1, further comprising rendering a user interface mechanism for switching between the first mode and the second mode.

3. A mobile computer system including a processor and a memory, comprising:

a first module arranged to initialize communication via a wireless network interface connection with a server computer, the server computer caching the requested web page from another computer;

a second module arranged to receive selection of a first mode or a second mode and to respond to selection of the first mode or second mode by transmitting information about the selection of the first mode or the second mode to the server computer in a hypertext transfer protocol (HTTP) packet;

a third module arranged to, in response to receiving selection of the first mode:
  detect presence of a feed corresponding to the requested web page from the server computer in the first mode; and
  receive the feed corresponding to the requested web page from the server computer in the first mode;

a fourth module arranged to:
  in response to detecting the feed in the first mode, automatically terminate loading of the requested web page and initializing loading of the feed without a user input; and
  in response to receiving selection of the second mode, receive the requested web page from the server computer without the feed corresponding to the requested web page in the second mode; and a fifth module arranged to display the feed or the requested web page in response to receiving the feed or the requested web page.

4. A system, comprising:
a mobile client computer communicating over a wireless network and having a browser application installed thereon, the browser application configured to:
request a web page from a network via a wireless network interface connection,
transmit, via the network, selection of a first mode or a second mode to a server computer caching the requested web page from another computer,
in response to receiving selection of the first mode:
  detecting presence of a feed corresponding to the requested web page from the server computer;
  in response to detecting the feed, automatically terminating loading of the requested web page and initializing loading of the feed without a user input;
  receive the feed corresponding to the requested web page from the server computer; and
  responsive to receiving the feed, display the received feed;
in response to receiving selection of the second mode:
  receive the requested web page from the server computer without the feed corresponding to the requested web page; and
  in response to receiving the requested web page, display the requested web page; and
the server computer operatively connected to the network and arranged to cache at least one of the requested web page and the feed from another computer;
wherein transmitting the selection of the first mode or the second mode comprises transmitting information about the selection of the first mode or the second mode in a hypertext transfer protocol (HTTP).

5. The system of claim 4, wherein the server computer is further arranged to cache a location of the feed.

6. The system of claim 4, wherein the server computer is configured to:
determine whether a location of the feed is cached in the server computer; and
retrieve and send the feed to the client computer responsive to the feed being cached in the server computer.

7. A computer-readable medium storing instructions adapted to display a feed on a mobile computer communicating over a wireless network, the instructions when executed by a processor in the computer cause the processor to:
access a network for a requested web page via a wireless network interface connection;
transmit, via the network, selection of a first mode or a second mode to a server computer, the server computer caching the requested web page from another computer;
in response to receiving selection of the first mode:
  detect presence of a feed corresponding to the requested web page from the server computer;
  in response to detecting the feed, automatically terminate loading of the requested web page and initializing loading of the feed without a user input;
  receive the feed corresponding to the requested web page from the server computer; and
  in response to receiving the feed, display the feed;
in response to receiving selection of the second mode:
  receive the requested web page from the server computer without the feed corresponding to the requested web page from the server computer, and
  in response to receiving the requested web page, display the requested web page;
wherein the instructions to transmit the selection of the first mode or the second mode includes instructions for causing the processor to transmit information about the selection of the first mode or the second mode in a hypertext transfer protocol (HTTP) packet.

8. The computer-readable medium of claim 7, further comprising instructions to render a user interface mechanism for selecting the first mode or the second mode.

9. The computer-readable medium of claim 7, wherein the feed is a RSS feed.

* * * * *